United States Patent [19]
Domack

[11] Patent Number: 5,713,152
[45] Date of Patent: Feb. 3, 1998

[54] FISHING BOBBER WITH INTEGRAL PIVOTED LINE HOLDER

[76] Inventor: Mark L. Domack, 1400 E. Hastings Lake Rd., Jonesville, Mich. 49250

[21] Appl. No.: 630,008

[22] Filed: Apr. 8, 1996

[51] Int. Cl.$^6$ ............................................. A01K 91/03
[52] U.S. Cl. ........................... 43/44.95; 43/44.87; 24/543; 24/908
[58] Field of Search ................... 43/44.92, 44.89, 43/44.87, 44.95, 43.1, 43.12, 44.83, 44.85; 24/30.5 P, 462, 543, 908, 518

[56] References Cited

U.S. PATENT DOCUMENTS

| | | | |
|---|---|---|---|
| 1,193,684 | 8/1916 | Gregory et al. | 43/44.92 |
| 2,803,083 | 8/1957 | Moore | 43/44.93 |
| 3,141,256 | 7/1964 | McBriar | 43/43.11 |
| 3,187,780 | 6/1965 | Koch | 43/44.95 |
| 3,431,671 | 3/1969 | Orenick et al. | 43/44.87 |
| 3,778,871 | 12/1973 | Ratte, Jr. | 43/44.87 |
| 4,296,529 | 10/1981 | Brown | 24/30.5 P |
| 4,964,236 | 10/1990 | Adams | 43/44.92 |
| 5,241,776 | 9/1993 | Adams | 43/44.92 |

*Primary Examiner*—Joseph J. Hail, III
*Attorney, Agent, or Firm*—Flynn, Thiel, Boutell & Tanis, P.C.

[57] ABSTRACT

A fishing bobber molded of a synthetic plastic material wherein a hollow flotation chamber includes separable upper and lower snap together parts whereby ballast may be located within the chamber to adjust flotation sensitivity, and an elongated downwardly extending stem includes a latch having a hinge homogeneously formed of the stem material wherein the latch is pivotally positionable between a closed position for gripping the fishing line, and an open position for releasing the line. Manual lateral deformation of the stem unlocks the latch from its closed position.

8 Claims, 1 Drawing Sheet

FISHING BOBBER WITH INTEGRAL PIVOTED LINE HOLDER

BACKGROUND OF THE INVENTION

1. Field of the Invention

The invention pertains to buoyant fishing bobbers molded of synthetic plastic material and wherein a fishing line latch or retainer is homogeneously hinged to the basic bobber structure.

2. Description of the Related Art

While two-piece fishing bobbers are known wherein the basic body of the bobber is formed of two interconnectable portions, as shown in U.S. Pat. Nos. 2,803,083 and 3,141,256, such prior art devices normally produced a separable body chamber for the purpose of storage of the line, hooks and sinkers. Also, while it is known to incorporate homogeneous integral line attachment components with fishing line accessories, such as sinkers, as shown in U.S. Pat. Nos. 4,964,236 and 5,241,776, the utilization of integral fish line holding structure with a bobber is not common.

Prior art fishing bobbers molded of synthetic plastic material are of such complexity as to be relatively expensive, and bobbers utilizing pivoting fish line retainers do not incorporate the low cost advantage of pivotally hinging the fish line latch to the bobber structure by a homogeneous hinge portion or element wherein the latch and the associated bobber structure are formed as an integral one-piece unit.

OBJECTS OF THE INVENTION

It is an object of the invention to provide a low cost moldable synthetic plastic fishing bobber having a flotation or buoyancy chamber formed of two portions which may be readily separated to permit ballast to be located within the chamber to adjust buoyancy sensitivity.

Another object of the invention is to provide a low cost moldable fishing bobber having a lower stem upon which a fishing line latch is homogeneously molded pivotal about a homogeneous hinge between open and closed positions to selectively retain or release the fishing line.

Yet another object of the invention is to provide a fishing bobber molded of a synthetic plastic material which is of very low cost, effective and efficient in operation, and capable of effectively adjustably gripping a fishing line, and releasing the same, requiring no special skills on the part of the fisherman.

SUMMARY OF THE INVENTION

The fishing bobber of the invention is molded of a synthetic thermoplastic material whereby the bobber may be economically manufactured without requiring secondary operations.

The bobber consists of an upper part which is releasably connected to a lower part at a fluid tight connection. The connectable portions, together, define a hollow body or cavity which produces the bobber buoyancy. By temporarily separating the upper and lower parts, ballast, such as water or other matter, may be placed within the cavity to add weight to the bobber causing it to float low in the water and increasing the sensitivity of bobber to fish feeding on the fishing line depending from the bobber.

The lower part of the bobber includes a homogeneous elongated stem having a lower end and a latch is pivotally defined on the stem by a homogeneous hinge portion formed of the material of the stem and latch. The upper end of the latch associates with a lock formed on the stem whereby the latch may be held parallel to the length of the stem with a fishing line pinched between the latch and the stem permitting the line to be adjustably affixed to the bobber.

The flexible thermoplastic material of which the bobber is formed permits the stem to be laterally deformed or bent which will release the latch from the stem lock permitting the latch free end to pivot away from the stem to free the line.

The construction of a fishing bobber in accord with the invention permits the bobber to be constructed at a low cost, is dependable in operation, and may be used by fisherman of average skill to effectively attach and release a fishing line to a bobber.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
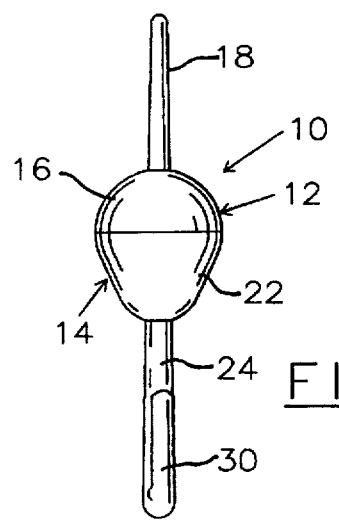
FIG. 1 is an elevational view of a fishing bobber in accord with the invention, the upper and lower parts thereof being connected, and the latch being shown in the closed position.
Figure 2:
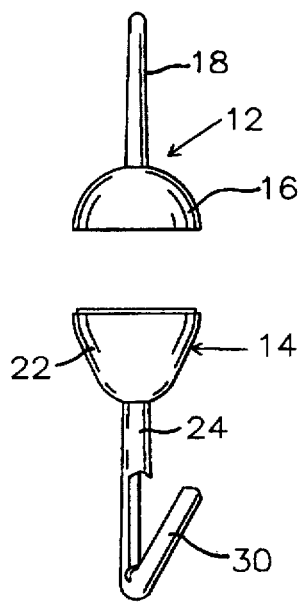
FIG. 2 is an elevational view of the invention illustrating the upper and lower parts separated, and the latch hinged to the open position.

A typical general configuration of a fishing bobber utilizing the inventive concepts is shown in FIG. 1 wherein the bobber is generally indicated by reference numeral 10.

The bobber 10 includes an upper body part 12 and a lower body part 14 which is releasably interconnected in a watertight manner to the body part 12 as later explained. The upper part 12 includes a bell 16 having an elongated flag 18 extending therefrom, and the lower edge 20 of the bell 16 is of a configuration as will be appreciated from FIG. 6.

Figure 6:
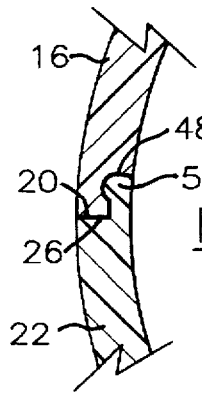
FIG. 6 is an enlarged detail elevational sectional view taken through the connecting joint of the bobber upper and lower parts.
Figure 7:
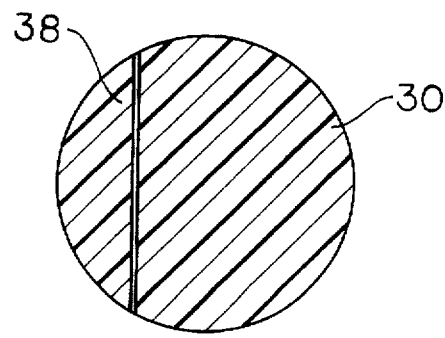
FIG. 7 is an enlarged plan sectional view of the stem taken along Section 7—7 of FIG. 3.

The lower body part 14 is of a dish configuration at 22 and includes a downwardly extending elongated stem 24. The upper edge 26 of the dish 22 is shown in FIG. 6 and is complementary in configuration to the edge 20.

Preferably, the bobber parts are molded of a synthetic thermoplastic material of an attractive low cost characteristic having flexing ability, such as a polypropylene. The material may be colored, or clear, as desired. The flag 18 is integral and homogeneous with the bell 16, while the stem 24 is integral and homogeneous with the dish 22. With modern injection molding equipment, the parts 12 and 14 may be simultaneously formed and automatically ejected from the molding die at the end of formation.

The stem 24 includes a free cantilevered lower end 28 which may be of a convex configuration as shown in full lines in the drawing. A latch 30 homogeneously formed of the material of the stem 24 includes a hinge portion 32 homogeneously defined on the stem lower end 28 and the hinge 32 is formed of the material of the stem and is integral both with the stem lower end and the lower region of the latch 30. The homogeneous hinge 32 permits the latch 30 to be pivoted between the closed position shown in FIG. 3 and the open position shown in FIG. 5.

A bulbous projection 34 is defined on the latch 30 adjacent the hinge 32 and this projection is complementary to a recess 36 defined in the lower region of the stem 24 for receiving the fishing line as later described.

As will be appreciated from the drawings, the stem 24 includes a reduced semi-circular portion 38 adjacent the latch 30, and the stem also includes a lip 40 which extends downwardly toward the stem lower end 28. A tongue 42 is defined on the upper free end of the latch 30, and the upper end of the latch also includes an inclined ramp 44 which, when the latch 30 is pivoted from the position of FIG. 5 to the position of FIG. 3, engages the lip 40 slightly bending stem portion 38 and depressing the latch 30 downwardly so that the tongue 42 will be received under the stem lip 40 and in this manner, the lip 40 will retain the latch 30 in the closed position shown in FIG. 3.

Figure 3:
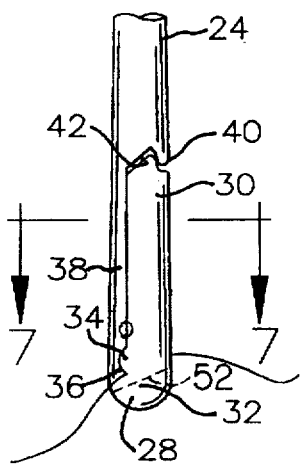
FIG. 3 is a detail enlarged elevational view of the lower end of the bobber stem illustrating the fishing line latch in the closed position retaining a fishing line to the bobber.
Figure 5:
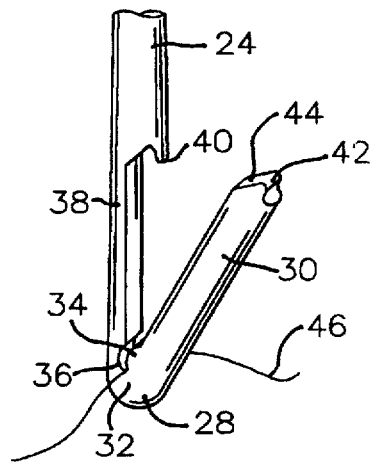
FIG. 5 is an elevational enlarged detail view of the lower end of the stem illustrating the latch in the open position.

The fish line 46 may be inserted between the latch 30 and the stem portion 38 when the latch is in the open position shown in FIG. 5. The fish line 46 is preferably located within the recess 36 so that when the latch 30 is pivoted to the closed position of FIG. 3, the projection 34 will tightly frictionally engage the fish line 46 so that the parts are related as shown in FIG. 3. As the projection 34 is located adjacent the hinge 32, and as the projection 34 and recess 36 are complementary in configuration, the fish line 46 will be tightly squeezed between the projection and recess establishing a firm frictional connection between the fishing bobber and fishing line.

The interconnection between the upper body 12 and the lower body part 14 is best illustrated in FIG. 6. As shown, the edge 20 of the part 12 includes an annular concave recess 48, and the upper edge 26 of the dish 22 includes a rounded convex head 50 complementary in configuration to the recess 48. The flexibility of the material of the parts 12 and 14 permits the head 50 to be popped out of the recess 48 to separate the parts 12 and 14, and in this manner, when the parts are separated, ballast in the form of water, lead pellets, or the like, may be placed within the cavity defined by the parts 12 and 14 to add weight to the bobber and vary the buoyancy and sensitivity of the bobber during fishing.

Figure 4:
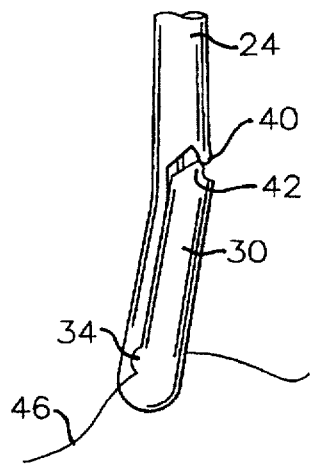
FIG. 4 is an enlarged detail elevational view of the lower end of the stem upon being laterally deformed to release the latch lock.

In use, assuming the latch 30 to be in its latched position shown in FIG. 3, the user need only slightly deform the stem 24 as shown in FIG. 4 to permit the latch tongue 42 to ride under the stem lip 40 permitting the latch 30 to pivot to its open position as shown in FIG. 5. At this time, the fishing line 46 may be easily removed from the recess 36 and the position of the bobber on the line may be adjusted or the fish line removed.

When the latch 30 is pivoted to the closed position shown in FIG. 3, the ramp 44 initially engages the lip 40 which causes a slight deformation of the stem 24 and the fully latched position is shown in FIG. 3. The natural resiliency of the material of the stem 24 permits the stem to be readily deformed during the opening and closing operations of the latch, and by forming the bobber parts of polypropylene or similar material, the hinge 32 is capable of thousands of repetitions without breakage.

If it is desired to reduce the force necessary to pivot the hinge 30 between open and closed positions, the wall thickness of the stem adjacent the hinge 32 may be reduced by terminating the end of the stem along a plane such as shown at 52 in FIG. 3 in dotted lines. In such a situation, the amount of material in the hinge 32 is minimized permitting the hinging of the latch to be easily accomplished.

It is appreciated that various modifications to the inventive concepts may be apparent to those skilled in the art without departing from the spirit and scope of the invention.

I claim:

1. A fishing bobber comprising, in combination, a hollow buoyant body having a lower region, an elongated bendable stem extending from said body lower region formed of a flexible synthetic material, a latch homogeneously defined on said stem formed of the stem material, said latch being of an elongated form having a free end and a hinge end, a hinge interconnecting said latch hinge end to said stem permitting said latch to pivot between closed and open positions, said hinge comprising a flexible portion homogeneously formed of the material of said stem and latch, and a latch catch defined on said stem engaging said latch free end when said latch is in said closed position and releasing said latch free end when said stem is bent in a direction so as to effect a separation of said latch free end from said latch, said latch facilitating an orienting of a fishing line between itself and said stem when in said closed position and releasing the fishing line when pivoted to said open position.

2. In a fishing bobber as in claim 1, said latch catch including a lip defined on said stem overlapping a portion of said latch free end when said latch is in said closed position.

3. In a fishing bobber as in claim 2, said latch being of an elongated configuration having a length, said latch being substantially parallel to said stem when in said closed position.

4. In a fishing bobber as in claim 2, a tongue defined on said latch free end, said lip engaging said tongue when said latch is in said closed position.

5. In a fishing bobber as in claim 1, a recess defined in said stem adjacent said hinge flexible portion, and a projection defined on said latch adjacent said hinge flexible portion complementary in configuration to said recess and snugly received therein upon said latch being pivoted to said closed position whereby the fish line may be placed within said recess upon said latch being pivoted to said open position and said fish line will be clamped between said recess and said projection upon said latch being pivoted to said closed position.

6. In a fishing bobber as in claim 1, said stem having a free terminating end, said hinge flexible portion being located adjacent said stem free end.

7. In a fishing bobber as in claim 6, a reduced wall thickness defined in said stem at said hinge flexible portion to facilitate deformation and pivoting of said hinge portion.

8. In a fishing bobber as in claim 1, said latch gripping the fishing line when in said closed position.

* * * * *